United States Patent [19]
Regier

[11] Patent Number: 4,850,492
[45] Date of Patent: Jul. 25, 1989

[54] CONVEYOR SYSTEM EJECTOR WHEEL

[76] Inventor: Robert D. Regier, 22502 E. Floral, Dinuba, Calif. 93618

[21] Appl. No.: 34,763

[22] Filed: Apr. 6, 1987

[51] Int. Cl.$^4$ .............................................. B07C 5/36
[52] U.S. Cl. ................................... 209/653; 198/372; 209/562
[58] Field of Search ............... 209/651, 653, 560, 561, 209/562; 198/372

[56] References Cited

U.S. PATENT DOCUMENTS

| | | | |
|---|---|---|---|
| 2,355,280 | 8/1944 | Dichter | 209/653 |
| 2,606,657 | 8/1952 | Berthelsen | 209/653 |
| 2,609,926 | 9/1952 | Hartig et al. | 209/653 |
| 3,040,862 | 6/1962 | Schmermund et al. | 209/653 |
| 3,471,012 | 10/1969 | Calhoun | 198/372 |
| 3,771,648 | 11/1973 | Revuelta | 198/372 |
| 3,791,518 | 2/1974 | Vanderhoof | 209/653 |
| 4,320,840 | 3/1982 | Braschos | 198/372 |
| 4,501,365 | 2/1985 | Peyton et al. | 209/653 |

FOREIGN PATENT DOCUMENTS 1246292  9/1971  United Kingdom ................ 209/653

Primary Examiner—James B. Marbert
Assistant Examiner—Donald T. Hajec
Attorney, Agent, or Firm—Freilich, Hornbaker, Rosen & Fernandez

[57] ABSTRACT

An ejection station for a conveyor sorter having a carrousel ejector wheel with reciprocating fingers. The ejector wheel has a front side mounted adjacent the edge of the supply conveyor belt. The bottom of the wheel moves at substantially the same speed as the belt and in the same direction. The ejector fingers are mounted around the outer surface of the wheel and move axially out of the front side over the conveyor belt to eject items from the belt. Operation of a finger is initiated when the nib of the finger enters a V-shaped guide groove. As the wheel rotates, the nib moves along one leg of the "V" pushing the finger out. At the middle of the groove, the direction of the finger reverses and the nib moves along the other leg of the "V" retracting the finger into the wheel.

10 Claims, 3 Drawing Sheets

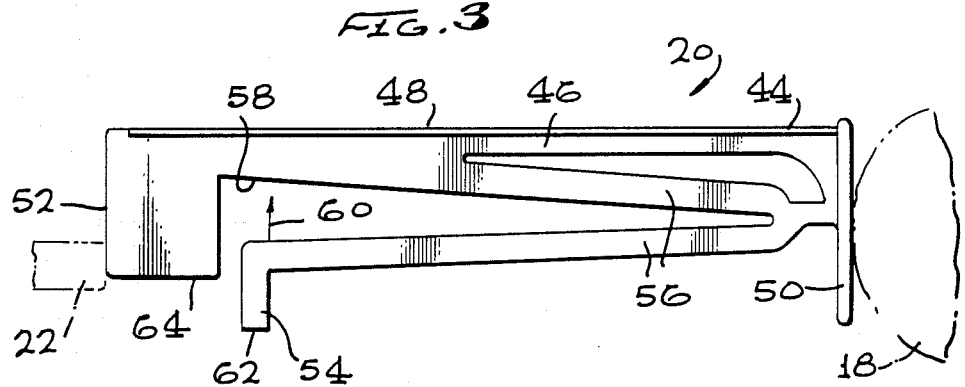
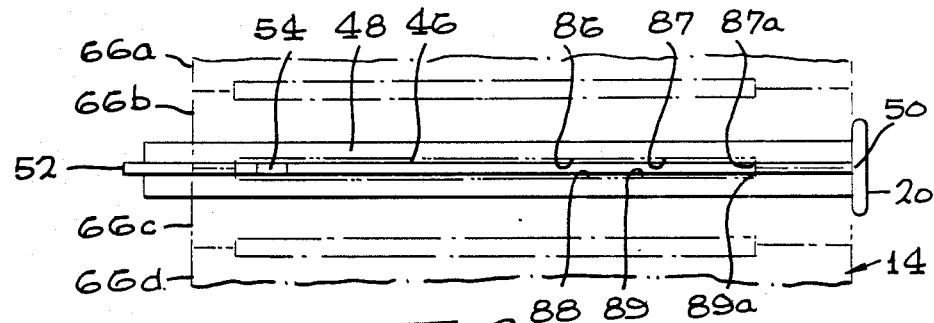
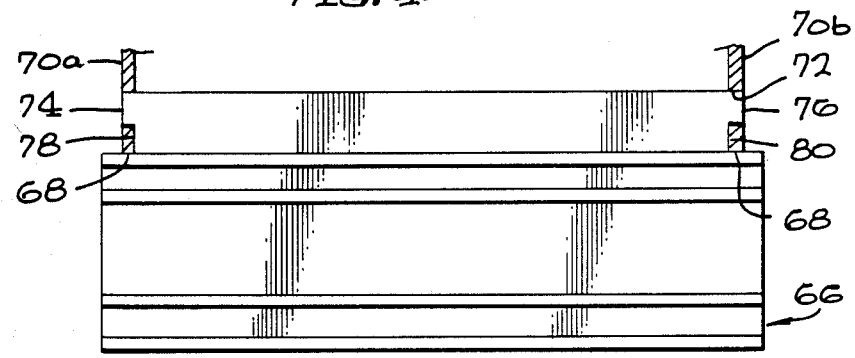
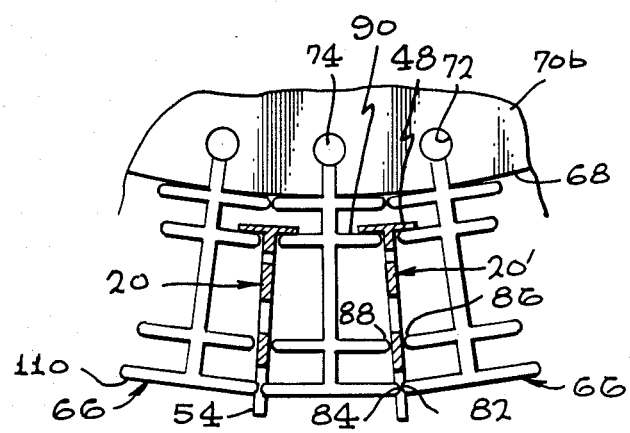

CONVEYOR SYSTEM EJECTOR WHEEL

TECHNICAL FIELD

The present invention pertains to the automatic sorting art, and more particularly, to an ejection station for a conveyor sorter having a carrousel ejector wheel with reciprocating fingers.

BACKGROUND ART

Conveyor type sorters are widely used for the high speed separation of similar articles into two or more classes. The items are carried on a supply conveyor belt that passes through the sorter. The items are ejected or moved sideways on the belt into the desired catagories.

Where the items to be sorted are easily damaged such as agricultural produce or glass bottles, the items need to be separated gently in order to avoid bruising or breakage. One type of conveyor sorter for this purpose utilizes a roller chain belt moving parallel to the supply conveyor belt at substantially the same speed. The roller chain belt carried hundreds of pushers that move transversely over the supply conveyor belt when activated to push items on the belt. The sorting process utilized by these conveyor sorters includes determining what to do with the item, determining the position of an item on the supply conveyor, selecting a pusher or pushers to perform the sorting task, waiting until the pusher is in the proper position, extending the pusher, and retracting the pusher. Since the forward speeds of the item and the pusher are the same, the pusher is able to engage and push the item transversely for a relatively long period of time. The extension and retraction of the pusher is typically controlled by means of a cam guide that angles gently toward the supply conveyor and then away. Conveyor sorters having one or more of these characteristics are disclosed in U.S. Pat. Nos. 3,471,012; 3,771,648; 3,791,518; and 4,501,365.

Another device utilizing similar principles is disclosed in U.S. Pat. No. 2,609,926 entitled Bottle Sorting Machine. In this device, a turntable is positioned adjacent the supply conveyor belt on an axle perpendicular to the horizontal plane of the belt. Pushers on the turntable selectively move perpendicular to the axle to push bottles transversely on the supply conveyor belt. Each pusher has a forward lip for engaging the leading side of a bottle. The turntable is rotated thereby entirely due to the forward movement of the bottles on the supply conveyor belt. If a bottle is to be ejected, a solenoid starts the pusher for the bottle into an ejection cam guide.

Both the roller chain belt and turntable types of conveyor sorters have limitations. For example, the pusher roller chain belt devices have hundreds of parts changing direction with respect to each other at the ends of the chain belt causing noise and wear. The turntable device is able to operate against the pushed items only for a relatively short period of time due to the limited arc of the wheel in the usable position. An ejector means having a relatively long pusher operating time and no relative part movement except for that required to eject and retract a pusher would provide significant practical advantages.

DISCLOSURE OF INVENTION

The present invention is directed to an ejection station for a conveyor sorter having a carrousel ejector wheel with reciprocating fingers that selectively bpush items resting on the conveyor supply belt. The conveyor belt is of the type that moves in a predetermined direction at a predetermined speed along a linear path defined by the intersection of a horizontal plane and a vertical plane with its upper surface moving in the horizontal plane. The ejector wheel has an axle mounted parallel to the horizontal plane and perpendicular to the vertical plane of the belt. The cylindrical outer surface of the wheel is rotatable about the axle and moves adjacent the horizontal plane substantially in the predetermined direction and at the predetermined speed. The front side of the wheel is mounted near the belt and facing it. A plurality of ejector fingers are mounted adjacent the outer surface and are selectively movable parallel to the axle out of the front side over the conveyor belt for pushing the items. A means is also provided for determining when one of the fingers is to be activated to move an item.

In accordance with one important aspect of the invention, the means for selectively moving an ejector finger includes a nib on the ejector finger that projects outside the outer surface of the ejector wheel. The nib operates in conjunction with a guide groove mounted adjacent the outer surface of the wheel. When the nib enters the guide groove, the ejector finger is initially moved toward the item as the ejector wheel rotates and then retracts as the wheel continues to rotate.

In a preferred embodiment, the means for selectively moving the ejector finger includes a solenoid for tapping the nib onto the guide groove and magnets coupled to the ejector wheel for providing information as to the exact location of the wheel. The magnets are sensed by a magnetic field sensing device that produces a signal each time a magnet passes. A control means activates the solenoid only when the signals indicate that the desired ejector finger is in the proper position to tap the nib into the groove to start the process.

In accordance with another important aspect of the invention, the ejector finger has a T-shaped body with a rib and a runner perpendicular to each other. The front face of the finger is perpendicular to the body and the heel is spaced from the face on the other end of the rib. The heel is hit by the solenoid to start the finger on the ejection process. In a preferred embodiment, the nib is positioned on the rib opposite the runner and is biased away from the runner.

In accordance with another important aspect of the invention, the carrousel ejector wheel is comprised of an axle, identical circular front and rear plates mounted on the axle, a plurality of finger holders fitted adjacent each other between the plates and defining the outer surface of the wheel, and an ejector finger slidably mounted between each adjacent pair of finger holders. The plates are provided with holes adjacent their peripheral surfaces for each of the finger holders. The finger holders have front and rear pins for fitting into the holes to retain the finger holders in the wheel. The front pins fit into the front plate and the rear pins fit in the rear plate. The sides of the finger holders butt against each other securing the finger holders rigidly between the plates. Ejector finger grooves in the sides of the finger holders allow adjacent pairs of finger holders to slidably retain an ejector finger between them.

In a preferred embodiment, the nib projects through nib indents in the ejector finger grooves to extend outside the outer surface of the wheel. Front shoulders on the nib indents prevent the ejector finger from falling out of the wheel. If desired, the nib may be pressed under the front shoulders to release the ejector finger from the wheel.

BRIEF DESCRIPTION OF DRAWINGS

FIG. 3 is a side elevational view of an ejector finger;

FIG. 4 is a bottom plan view of an ejector finger with adjacent finger holders shown in outline;

FIG. 5 is a side elevational view of a finger holder;

FIG. 6 is a rear elevational view of the lower portion of an ejector wheel;

MODES FOR CARRYING OUT THE INVENTION

Figure 1:
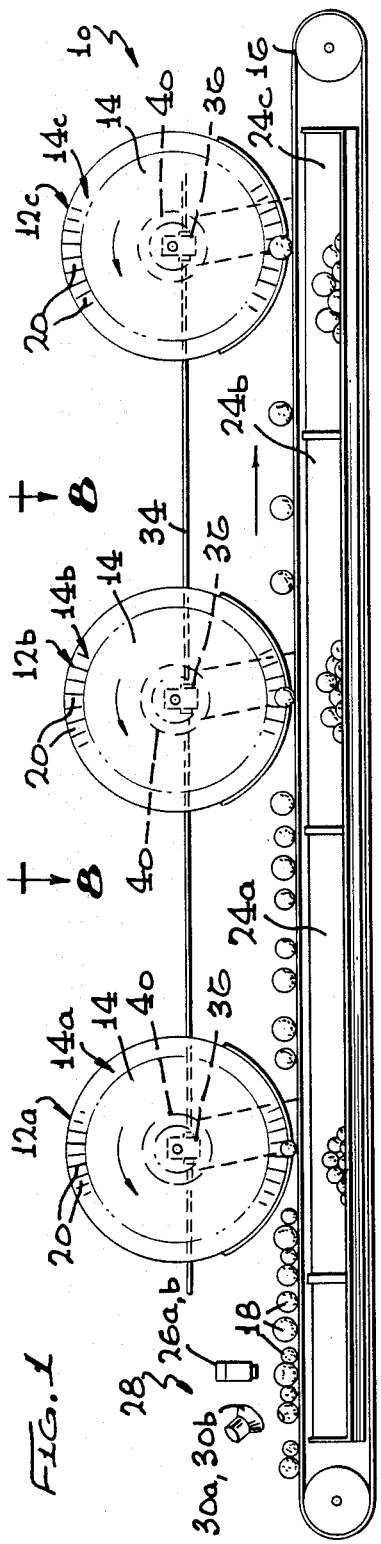
FIG. 1 is a side elevational view of a conveyor sorter having three ejection stations with carrousel ejector wheels in accordance with the present invention.
Figure 2:
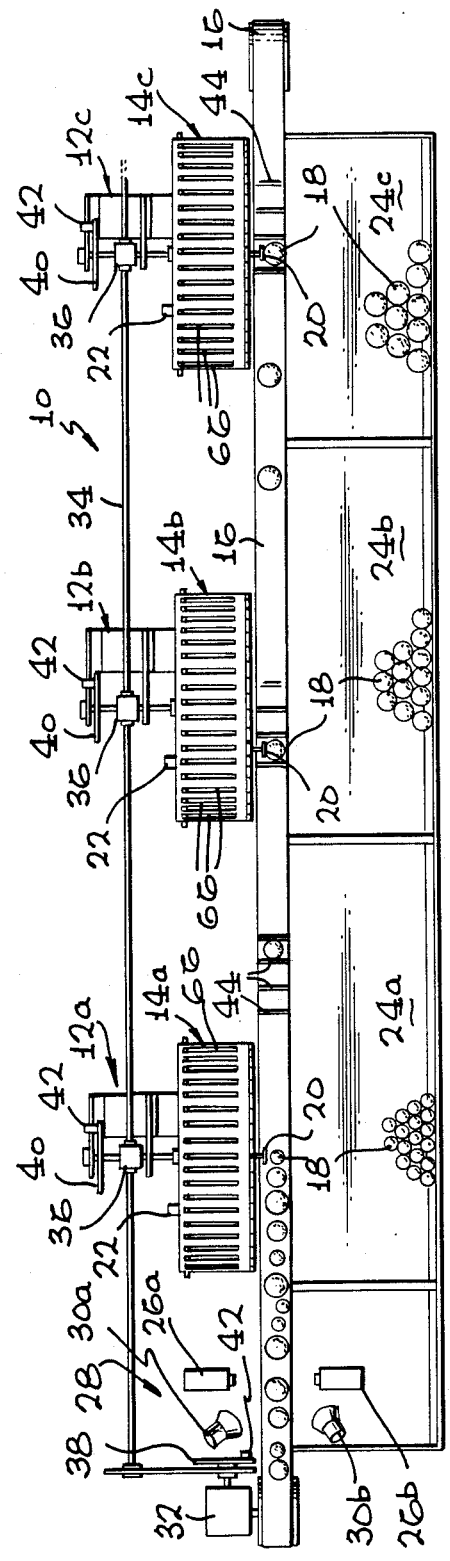
FIG. 2 is a top plan view of the conveyor sorter of FIG. 1.

Referring initially to FIGS. 1 and 2, there is illustrated a conveyor sorter 10 having a plurality of ejection stations, generally designated 12a, 12b, and 12c, with carrousel ejector wheels 14a, 14b, and 14c, of the present invention. FIG. 1 is a side elevational view and FIG. 2 is a top plan view. The conveyor sorter 10 is used for sorting agricultural produce such as fruits, nuts, and vegetables and may also be used to sort other types of items such as boxes and bottles.

The conveyor sorter 10 is comprised of two subsystems: a mechanical item handling subsystem and a computer based item sizing and control subsystem. The mechanical subsystem utilizes a V-shaped cogged conveyor belt 16 for carrying the items 18. The mechanical subsystem also includes the carrousel ejector wheels 14, ejector fingers 20 on the wheels, and solenoids 22 for activating the ejector fingers. When an ejector finger 20 is selected, the finger ejects the item 18 into one of the bins 24a, 24b, or 24c. The computer based item sizing and control subsystem utilizes one or more cameras 26a and 26b and a computer to determine the size and position of each item on the belt 16 and to exercize overall control, particularly over the carrousel ejector wheels 14.

Unsorter items 18 are placed on the cogged conveyor belt 16 one at a time in a process called singulation that is well known in the art. The items 18 pass through a sizing station 28 that includes the cameras 26a and 26b and lights 30a and 30b. Light reflected from an item 18 is detected by the cameras 26 which repeatedly make linear scans of the item. Two cameras are preferably used mounted in an orthogonal relationship because of the inherent asymmetry of produce items. A computer analyzes the signals from the cameras 26 to determine the leading edge, trailing edge, midpoint, and maximum scan line dimensions of the item 18. The computer assigns the item 18 to a particular ejection station 12a, 12b, or 12c based on the maximum scan line dimensions. The computer also assigns a particular position on the belt 16 to the item 18 based on the midpoint of the item. The item 18 then passes rapdidy along on belt 16 (e.g., at a rate of 180 feet per minute) through one or more of the ejection stations 12a, 12b, or 12c. Upon reaching the appropriate station 12, the computer actuates a solenoid 22 to tap an ejector finger 20 at the appropriate time to eject the item from the belt 16 into a bin 24.

A motor 32 drives all of the components of the mechanical subsystem in unison. The ejector wheels 14 are driven through a common jack shaft 34 having right angle gearing 36 for each wheel. The common mechanical drive allows the peripheral velocity of the wheels 14 to be maintained at approximately the same velocity as the forward velocity of the belt 16.

Precise coordination of the mechanical subsystem with the computer based item sizing and control subsystem is provided by a master timing wheel 38 and ejector timing wheels 40 for each of the ejector wheels 14. A plurality of magnets are positioned about the periphery of each of the wheels 38 and 40. A magnetic field sensing device 42 such as a Hall effect device is positioned adjacent each of the wheels 38 and 40 to create an electronic signal that is sent to the computer each time a magnet passes. The signals allow the computer to assign an item 18 to a particular space on the belt 16 between two cogs 44. The signals from the master wheel 34 are also used by the computer to monitor the passage of an item 18 down the conveyor sorter 10. When the item 18 reaches the desired station 12, the computer establishes an initial election signal for the item but does not then activate a solenoid 22 to move an ejector finger 20. The computer first monitors the signals from the magnetic field sensing device 42 adjacent the ejector timing wheel 40. When the signals indicate that the selected finger 20 is in the proper position, the computer activates the solenoid 22 causing the preselected ejector finger 20 to eject the item 18 from the belt 16. It will be appreciated that other position sensing devices such as optical systems may be used for monitoring the exact positions of the fingers.

FIG. 3 is a full scale side elevational view of one ejector finger 20. FIG. 4 is a bottom plan view of the ejector finger 20 of FIG. 3. The ejector finger is preferably unitarily molded of a plastic material. All of the ejector fingers 20 on an ejector wheel are identical. The ejector finger has a T-shaped body 44 with a rib 46 and a runner 48. The runner 48 is perpendicular to the center of the rib 46. A front face 50 is perpendicular to the T-shaped body 44 on one end of the rib 46 and a heel 52 is on the other end. The front face 50 is the portion of the ejector finger 20 that actually contacts an item 18 on the conveyor belt. The heel 52 is the portion that is hit by the solenoid 22 starting the ejection process. A nib 54 is provided for controlling the movement of the finger after the initial hit by the solenoid 22 on the heel 52. The nib 54 is positioned on the rib 46 opposite the runner 48 and is biased away from the runner by the spring portions 56. As shown in FIG. 3, the nib 54 is fully extended and is at rest. It may be moved toward the runner 48 by pushing into a slot 58 as shown by the arrow 60 until the outer surface 62 is level with the bottom 64 of the rib 46. The pushing of the nib 54 into the slot 58 allows the ejector finger 20 to be easily removed from the wheel 20 if desired in case of breakage or need for repair as discussed below.

FIGS. 4, 5, and 6 illustrate finger holders 66 for the ejector fingers 20. The finger holders 66 are assembled around the outer surface of the wheel 14. Two finger holders 66b and 66c are shown in shadow outline in FIG. 4 holding a finger 20. FIG. 5 is a side elevational view of one of the finger holders 66 with a shadow outline sectional view of the lower circular peripheral surfaces 68 of the ejector wheel front and rear plates 70a and 70b. FIG. 6 is a rear elevational view of the lowest portion of the rear plate 70b with three finger holders 66a, 66b, and 66c assembled together and two ejector finger 20 and 20'.

The front and rear plates 70a and 70b are preferrably fabricated of metal and are identical. Each plate has a line of equally spaced holes 72 adjacent its circular peripheral surfaces 68 for retaining the finger holders 66. One hole is provided in each plate for each finger holder 66.

The finger holders 66 are preferrably molded of a plastic material. All of the finger holders 66 are identical. Each has front and rear pins 74 and 76 and pin shoulders 78 and 80. The pins 74 and 76 have a common axis. A finger holder 66 is retained in the wheel by fitting the pins 74 and 76 into a pair of the holes 72 with the pin shoulders 78 and 80 butting against the plates 70a and 70b. When the finger holders 66 are fitted in the plates, the first side 82 of one butts against the second side 84 of another to rigidly secure the holders in the wheel.

A first ejector finger groove 86 is provided in the first side 82 and a second ejector finger groove 88 is provided in the second side 84 to allow the adjacent set of finger holders 66 to slidably retain the ejector finger 20. The finger is suspended by its runner 48 in a runner support portion 90 at the top of the grooves 86 and 88. The nib 54 projects below the outer surface 110 of the wheel. As shown in FIG. 4, the first and second ejector finger grooves 86 and 88 have nib idents 87 and 89, respectively, allowing the nib 54 to project outside. When the finger 20 is extended by hand fully to the right in FIG. 4, the nib 54 hits the front shoulders 87a and 89a of the nib indents 87 and 89, respectively, thereby retaining the finger in the wheel. If it is desired to remove the finger 20 from the wheel for repair, the nib 54 is pressed (arrow 60 in FIG. 3) under the shoulders 87a and 89a releasing the finger from the wheel.

Figure 7:
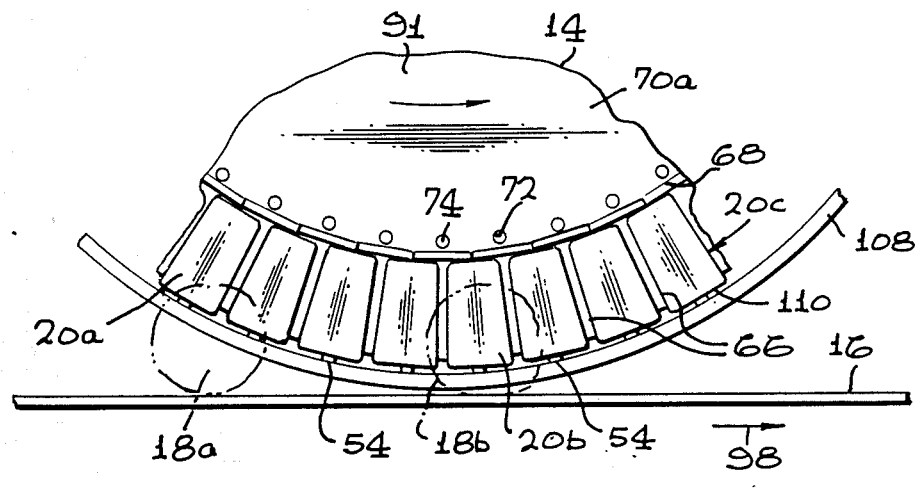
FIG. 7 is a front elevational view of the lowest portion of an ejector wheel.

FIG. 7 is a front elevational view of the lowest portion of an ejector wheel 14 enlarged from the view in FIG. 1. The finger holders 66 are assembled around the outer peripheral surface 68 of the front plate 70a with the front pins 74 fitted into the holes 72. The outer surfaces of the holders 66 define the substantially cylindrical outer surface 110 of the wheel 14. An ejector finger 20 is held between each pair of holders 66 with a total of forty-four fingers around the wheel 14. The nibs 54 of the fingers 20 protrude outside the holders 66.

The front side 91 of the wheel 14 is mounted facing the conveyor belt 16. The positioning of the wheel 14 vertically to the V-shaped belt 16 instead of horizontally as disclosed in the prior art substantially increases the time a finger 20 may effectively push an item 18. The time is somewhat dependent upon the relative sizes of the wheel 14 and the item 18. a typical relationship is shown in FIG. 7 where the items move from left to right on the belt 16 and the wheel 14 rotates counterclockwise. A finger may first contact an item when it will push the item transversely across the belt 16 instead of coming down on top of the item. This initial contact position occurs at approximately the position represented by the finger 20a and the item 18a. If it occurred at a different time, a different finger would be selected. The finger continues to contact the item as the wheel rotates to the lowest point represented by the finger 20b and the item 18b. The finger is then retracted and returns into the wheel 14 at the position represented by the finger 20c. In comparison, a finger on a horizontal wheel would be able to satisfactorily contact the item only at the position represented by the finger 20b and the item 18b. The result is that the vertical wheel 14 allows the finger 20 to gently contact the item 18 over a long period of time to eject the item from the belt 16 while a horizontal wheel requires a rapid push which may damage the item.

Figure 8:
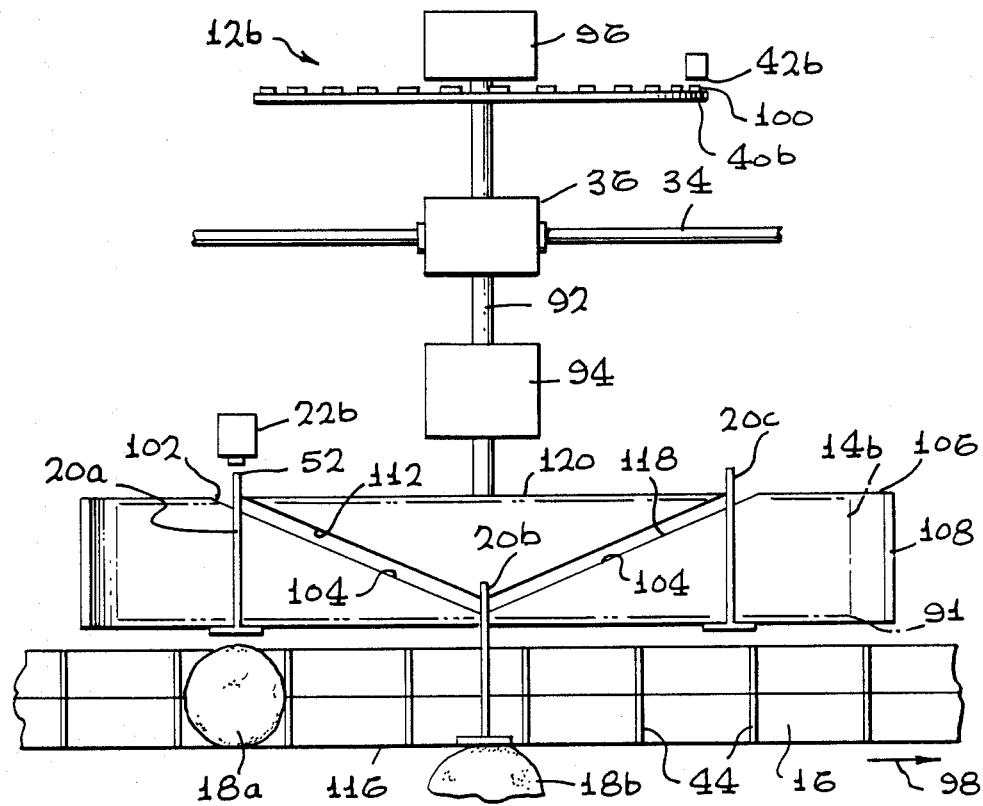
FIG. 8 is an enlarged view along the line 8—8 of FIG. 1 with the ejector wheel shown in broken lines and three representative ejector fingers indicated.

FIG. 8 is an enlarged view along the line 8—8 of FIG. 1 of the ejection station 12b with the ejector wheel 14b removed but with its position shown in broken lines. Three representative ejector fingers 20a, 20b, and 20c are shown. FIG. 8 is on a slightly reduced scale from FIG. 7. The positions of the fingers 20a, 20b, and 20c and the items 18a and 18b are identical. The conveyor belt 16 moves along a linear path defined by the intersection of a horizontal plane passing through its upper surface and a vertical plane through its middle. The belt 16 moves in a predetermined direction from left to right as indicated by the arrow 98 and at a predetermined speed. The ejector wheel 14 is mounted adjacent the belt 16 with its front side 91 facing the belt. The ejector wheel 14 rotates on an axle 92 mounted in two bearings 94 and 96. The axle is mounted substantially parallel to the horizontal plane of the belt 16 and perpendicular to the vertical plane through the middle of the belt. The axle 92 is turned by the jack shaft 34 through the right angle gearing 36. The gearing selected is such that the peripheral velocity and direction of the wheel 14 adjacent the belt 16 is substantially the same as the speed and direction of the belt. In order to take account of any variation of the speeds, precise identification of the position of the wheel 14 is provided to the computer at all times by the magnetic field sensing device 42b reading the magnets 100 in the ejector timing wheel 40b.

Operation of the conveyor sorter requires the coordination of the mechanical item subsystem and the computer based item sizing and control subsystem. By the time the item 18a has reached the point shown in FIG. 8, it has passed through the linear scan cameras 26 shown in FIGS. 1 and 2 where its size and position on the belt 16 have been determined by the computer. The cogs 44 of the belt insure that the item 18a remains in the same space as the belt is moved from left to right. The computer keeps track of the exact position of the item 18a on the belt 16 at all times by counting the pulses from the magnetic field sensing device 42 adjacent the master timing wheel 38 shown in FIGS. 1 and 2. Assuming the computer has assigned item 18a to the ejection station 12b for ejection from the belt, the computer established an initial ejection signal shortly before the position of item 18a illustrated in FIG. 8. The computer then samples the signals from the magnetic field sensing device 42b for the ejection station 12b. When the signals indicated that a finger is in the proper position to eject the item 18a, the computer sends a signal to energize the solenoid 22b to tap the heel 52 of the ejector finger 20a.

The solenoid 22b taps the ejector finger 20a far enough forward for the nib 54 (FIGS. 3 and 7) to hit the opening 102 of a guide groove 104 which guides the nib and the attached finger mechanically through the remainder of the ejection and retraction process as the wheel 14 rotates counterclockwise. The guide groove 104 is a channel on the upper surface of a guide groove member 108 that is mounted adjacent the lower part of the wheel adjacent the outer surface 110 as shown both in FIGS. 7 and 8. As the wheel 14 rotates, the nib 54 initially rides along the rear side 112 of the groove 104 pushing the finger 20a out of the front side 91 of the wheel parallel to the axle 92. When the finger reaches the position represented by the finger 20b in FIG. 8, the item (now represented as item 18b) is completely lifted up out of the V-belt 16 and falls of the edge 116. Then as the ejector wheel 14 continues to rotate counterclockwise, the nib 54 hits the front side 118 of the guide groove 104 pushing the finger 20b toward the rear surface 106 of the wheel to retract the finger back to the resting position as represented by the position of the finger 20c where it is ready for use again after another parallel revolution. It should be noted that the fingers 20 do not move as the wheel 14 rotates unless they are activated by the solenoid. The nibs of the unselected fingers remain outside the rear 120 of the guide groove member 108. This results in virtually no noise and no wear of the wheel except for the particular finger being used. This condition is the opposite of the prior art roller chain belt type devices where the carriers and fingers rattle and wear against each other at the ends of the travel even if they have not been used in a manner similar to that of a tank or tractor tread.

In view of the above, it may be seen that an ejection station with an ejector wheel and ejector fingers is provided. Of course, the structure may be variously implemented depending upon specific applications. Accordingly, the scope hereof shall not be referenced to the disclosed embodiments, but on the contrary, shall be determined in accordance with the claims as set forth below.

I claim:

1. An ejection station for a conveyor sorter for pushing items resting on a conveyor means of said conveyor sorter, said conveyor means movable along a substantially linear path defined by the intersection of a horizontal plane and a vertical plane in a predetermined direction at a predetermined speed, said conveyor means having an upper surface moving substantially in said horizontal plane, said ejection station comprising:
   a carrousel ejector wheel having:
      an axle mounted substantially parallel to said horizontal plane and perpendicular to said vertical plane and having an axis;
      a substantially cylindrical outer surface rotatable about said axis and movable adjacent said horizontal plane substantially in said predetermined direction of said predetermined speed;
      a front side positioned adjacent to and facing said conveyor means;
      a plurality of ejector fingers;
      means for mounting said ejector fingers adjacent said outer surface, said ejector fingers selectively movable parallel to said axis out of said front side over said conveyor means for pushing said items; and
   a means for selectively moving at least one of said plurality of ejector fingers.

2. An ejection station according to claim 1 wherein:
   said carrousel ejector wheel further includes a rear side spaced from said front side away from said conveyor means;
   each of said plurality of ejectro fingers has a nib projecting from said outer surface; and
   said means for selectively moving said ejector finger includes a guide groove member mounted adjacent said outer surface having a guide groove for selectively guiding said nib of said ejector finger to move said ejector finger out of said front surface as said ejector wheel rotates and then to retract said ejector finger as said ejector wheel continues to rotate.

3. An ejection station according to claim 2 wherein said means for selectively moving said ejector finger includes a solenoid for tapping said ejector finger to place said nib into said guide groove.

4. An ejection station according to claim 1 wherein said means for selectively moving said at least one of said ejector fingers includes a means for sensing the position of said ejector wheel and producing a signal and a control means for moving an ejector finger only when said signal indicates said ejectro finger is in a position to engage an item.

5. An ejection station according to claim 4 wherein said position sensing means includes a plurality of magnets coupled to said ejector wheel and a magnetic field sensing device for sensing said magnets and producing a signal when one of said magnets passes said magnetic field sensing device as said ejector wheel rotates.

6. An ejection station according to claim 3 wherein said means for selectively moving said at least one of said ejector fingers includes a plurality of magnets coupled to said ejector wheel, a magnetic field sensing device for sensing said magnets and producing a signal when one of said magnets passes as said ejector wheel rotates, and a control means for activating said solenoid only when said signal indicates said ejector finger is in a position to engage an item.

7. A carrousel ejector wheel comprising: an axle having an axis;
   a substantially cylindrical outer surface rotatable about said axis;
   front and rear plates, each plate having circular peripheral surfaces and a plurality of equally spaced holes adjacent said circular peripheral surfaces;
   said front and rear plates mounted on said axle and spaced from each other;
   a plurality of ejector fingers, each ejector finger having:
      a T-shaped body having a rib and a runner perpendicular to said rib;
      a front face perpendicular to said T-shaped body; and
      a heel spaced from said front face;
   a plurality of finger holders fitted adjacent each other around said circular peripheral surfaces of said front and rear plates and defining said substantially cylindrical outer surface of said ejector wheel, each finger holder having:
      front and rear pins and pin shoulders, said pins having a common axis and fitting into a pair of said plurality of holes in said plates, said front pin in said front plate and said rear pin in said rear plate, with said pin shoulders against said plates;
      a first side having a first ejector finger groove; and
      a second side having a second ejector finger groove and spaced from said first side; and
   an adjacent set of said first and second ejector finger grooves slidably retaining an ejector finger.

8. An ejector wheel according to claim 7 wherein:
   said ejector finger rib has a nib spaced from said runner;
   said first and second ejector finger grooves have nib indents with front shoulders; and
   said nib protects through said nib indents to extend outside said outer surface of said ejector wheel and abuts said front shoulders to retain said ejector finger in said ejector wheel.

9. An ejector finger according to claim 7 wherein:

said ejector finger rib has a nib spaced from said runner;

said nib is biased away from said runner;

said first and second ejector finger grooves have nib indents with front shoulders;

said nib projects through said nib indents to selectively extend outside said outer surface of said ejector wheel and selectively abuts said front shoulders to retain said ejector finger in said ejector wheel; and said nib selectively passes under said front shoulders to release said ejector finger from said ejector wheel.

10. Apparatus, useful in combination with conveyor means for transporting items along a substantially linear path passing along a vertical plane at a substantially constant speed, for ejecting selected items from said path, said apparatus comprising:

a substantially cylindrical means mounted for rotation about its axis;

a plurality of ejector members;

means mounting said ejector members on said cylindrical means around the circumference thereof for rotation therewith, said mounting means including means supporting each of said ejector members for reciprocal movement parallel to said axis between a retracted position and an extended position;

means for mounting said cylindrical means adjacent to said linear path with said axis extending substantially perpendicular to said vertical plane;

means for rotating said cylindrical means at an angular rate to move said ejector members at a linear rate substantially equal to said speed at which said items are transported along said linear path, and means for selectively moving at least one of said plurality of ejector members from said retracted position to said extended position and return.

* * * * *